United States Patent [19]
Becker

[11] Patent Number: 5,475,981
[45] Date of Patent: Dec. 19, 1995

[54] DRY ICE PELLITIZER

[75] Inventor: James R. Becker, North Ridgeville, Ohio

[73] Assignee: Waste Minimization & Containment Services, Inc., Cleveland, Ohio

[21] Appl. No.: 239,329

[22] Filed: May 6, 1994

[51] Int. Cl.⁶ ................................................. B29C 43/00
[52] U.S. Cl. ................................................. 62/35; 62/320
[58] Field of Search ................................. 62/35, 384, 165, 62/320

[56] References Cited

U.S. PATENT DOCUMENTS

| | | | |
|---|---|---|---|
| 3,835,657 | 9/1974 | Scudder | 62/35 |
| 4,314,451 | 2/1982 | Leeds et al. | 62/384 |
| 4,780,119 | 10/1988 | Brooke | 62/35 |
| 5,069,044 | 12/1991 | Holum et al. | 62/320 |

Primary Examiner—Ronald C. Capossela
Attorney, Agent, or Firm—Fay, Sharpe, Beall, Fagan, Minnich & McKee

[57] ABSTRACT

The invention pertains to an apparatus and process for producing predetermined size and density dry ice pellets used for blasting operations. Liquid carbon dioxide is compressed into solid dry ice within a computer controlled piston and cylinder extruder. The applied pressure by the piston is controlled to produce solid dry ice at a predetermined pressure while forward movement is controlled in an intermittent start-stop cycle where the "start" mode controls the length of the dry ice extrudate while the "stop" mode enables an exterior cutting device to cut the extrudate to the predetermined length. Preferred pellets exhibit uniform dimensions such as cylindrical or cubic pellets.

23 Claims, 2 Drawing Sheets

5,475,981

DRY ICE PELLITIZER

FIELD OF THE INVENTION

This invention pertains to a dry ice pellitizer for producing solid dry ice pellets of solidified carbon dioxide particularly useful for use with particle blasting equipment and particularly to a pellitizer adapted to automatically produce uniform size and density solid dry ice pellets.

BACKGROUND OF THE INVENTION

Compression extrusion is a known method for pressurizing snow by a hydraulic operated piston in a cylinder to produce solid dry ice blocks or discs. For instance, U.S. Pat. No. 4,780,119 discloses a method and apparatus for producing dry ice solid discs from liquid carbon dioxide. Conventional pellitizers are shown in U.S. Pat. No. 4,617,064 wherein liquid carbon dioxide is introduced into a piston cylinder and is compressed into a snow-like solid. The snow is further compacted and forced under pressure from the piston to pass through a die having a large number of bores to produce solid dry ice particles. The pellets can be conveyed to a discharge nozzle adapted to spray discharge the pellets at high velocity and pressure to blast an object for cleaning purposes. The dry ice pellets projected by the nozzle under pressurized gas provide the desired solid particles impact on the object. The particles readily sublime from the solid carbon dioxide to vapor phase carbon dioxide and thereby avoid a clean up mess typical with sand particles. Blasting with dry ice pellets is further suggested in U.S. Pat. No. 4,038,786. Conventional prior art methods of dry ice blasting, however, ordinarily utilize random size dry ice particles or collect dry ice particles by size distribution for use in the spray nozzle blasting equipment. Random size pellets extruded in varying non-uniform sizes and lengths are unevenly propelled under pressure while blasting to provide uneven impact and non-uniform results with the target surface being cleaned.

It now has been found that improved particle blasting results can be achieved by using uniform size dry ice pellets having a constant length, a constant width or diameter, and a constant solid density, where the preferred pellets comprise uniform dimensions. Preferred cylindrical pellets for instance would uniformly have the diameter and a length dimensions identical with all particles having the same density or uniform weight per volume. In accordance with this invention a dry ice pellet extruder is controlled by preset computer signals to compress liquid carbon dioxide into a loose snow solid followed by compacting the snow into a solid dry ice block within the extruder at a predetermined density of a set weight per volume. The extruder then automatically extrudes solid ice particles at the predetermined density to a predetermined length in conjunction with the set dimension of the die openings. The uniform size and equal density dry ice particles can then be collected and conveyed to a pressurized spray nozzle device for particle blasting. The uniform density and uniform size dry ice pellets blast target surfaces at constant velocity and produce substantially improved blasting results. These and other advantages will become more apparent by referring to the drawings and the detailed description of the invention.

SUMMARY OF THE INVENTION

Briefly, the invention pertains to a dry ice pellitizer adapted to produce uniform size pellets having predetermined dimensions and preselected density by means activated by computer controls. The pellitizer comprises a conventional movable piston disposed within a fixed cylinder for compressing liquid carbon dioxide into solid dry ice and subsequent extrusion through a fixed die to form dry ice pellets. The fixed die contains a plurality of preselected orifices of a uniform cross-sectional opening and preferably symetrical. The movable piston is computer controlled to provide a predetermined compression and produce solid dry ice block having a preselected density. The movable piston is further computer controlled to move the solid dry ice block a measured distance and thereby produce multiple extrudate of a constant length through the fixed die orifices. The piston movement automatically pauses momentarily upon reaching the predetermined extrudate length to enable a sharp cutting blade means located adjacent to the exterior surface of the fixed die to be activated by a computer and transversely cut the extrudate to the preselected length desired. The cycle is repeated over and over to produce dry ice pellets of constant uniform size and constant density in accordance with this invention.

IN THE DRAWINGS

FIG. 1: is a partial vertical section view of the dry ice pellitizer of this invention;

FIG. 2: is a partial side elevation view of the pellitizer taken from line 2—2 in FIG. 1 showing the extrusion end of the pellitizer;

FIG. 3: is a simplified schematic diagram indicating a continuous system for forming dry ice pellets from liquid carbon dioxide and conveying the dry ice pellets under pressure to a spray nozzle directed at a blasting target;

DETAILED DESCRIPTION OF THE PREFERRED EMBODIMENT

Figure 1:
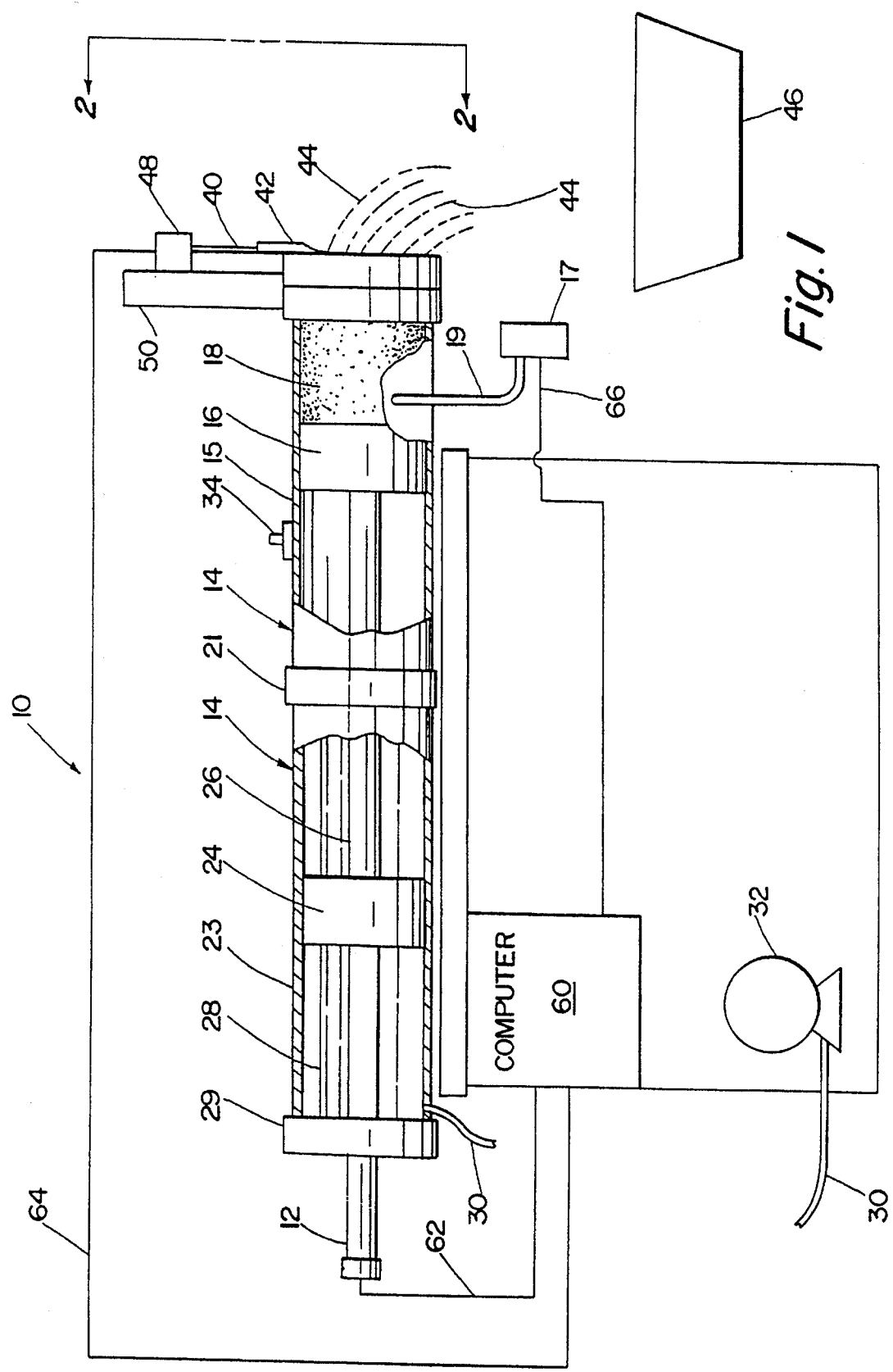
Figure 2:
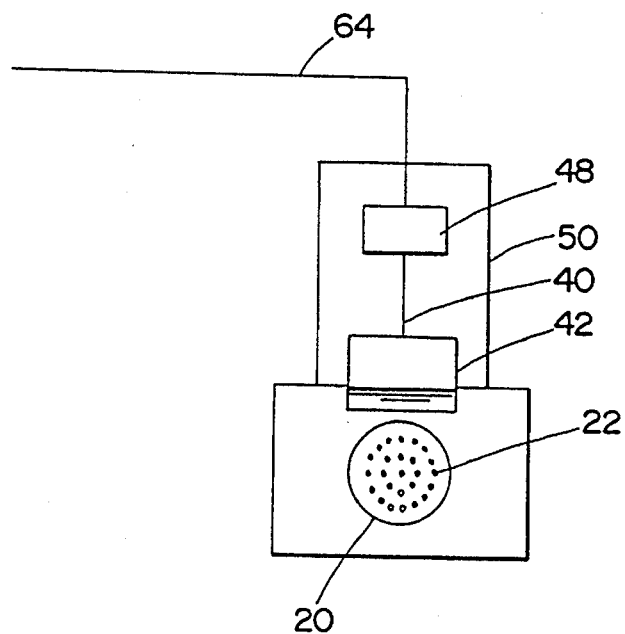

Referring now to the drawings wherein like reference characters designate like parts, FIG. 1 is a front elevation view of the pellitizer 10 of this invention shown mostly in vertical section.

The pellitizer 10 comprises movable piston members 16 and 24 operative within a closed cylinder 14, the piston being hydraulic fluid activated to move forwardly and rearwardly within the cylinder 14 which comprises a rearward hydraulic cylinder 23 and a forward compression chamber 15 interconnected by an intermediate wall member 21. The fluid may be oil or other preferred hydraulic substances.

Figure 3:
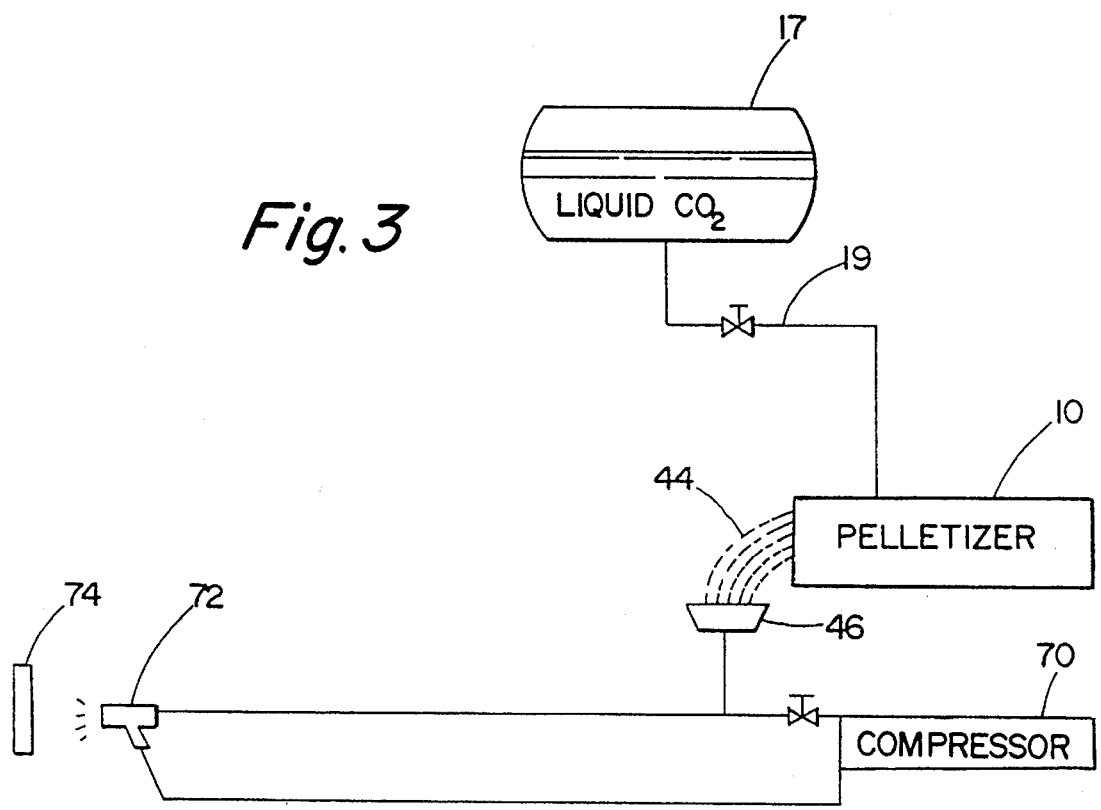

The forward piston head 16 compresses liquid carbon dioxide fed under pressure from a $CO_2$ source via a feed tube 19 and an automatic valve 17 to the forward compression chamber 15 to form a cylindrical block of solid dry ice 18. As shown in FIG. 3, solid dry ice 18 is extruded under pressure through a die member 20 having a plurality of uniform cross-sectional aperatures or die openins 22 for forming extrudate passing through each die opening 22. The forward piston head 16 is interconnected by a centrally disposed piston rod 26 with an intermediate hydraulic head 24 interfacing with hydraulic fluid 28 disposed between the intermediate head 24 and a rear wall member 29 and front wall 21 of the hydraulic cylinder 23. The hydraulic fluid 28 pumped into the hydraulic cylinder 23 through a hydraulic fluid feed line 30 interconnected to a pump 32. In use, the hydraulic piston head 24 and piston head 16 are fully retracted rearwardly to enable liquid carbon dioxide to enter the compression chamber 18 through the feed tube 19, whereupon forward compressing movement of the piston members 16 and 24 forms solid dry ice in the compression chamber 18 between the forward piston head 16 via the die member 20. Gaseous carbon dioxide formed, if any, can escape from inside the cylinder 15 through a vent 34 to form solid dry ice 18 having a predetermined density in weight per volume. The solid dry ice 18 passes through die 20 to form extrudate having the density predetermined by the computer controlled measuring device 12, which is an electronic device which is used to measure the forward and rearward position of the piston members in the cylinder 14. Located outside the cylinder 15 and laterally adjacent to the die 20 is a cutting means 40 compressing a sharp cutting edge blade 42 operative to reciprocate downwardly and slide against the exterior surface of the die 20 and produce predetermined length pellets 44 of dry ice collected in a bin 46. The cutting means 40 is operatively interconnected to a control means 48 secured above the die 20 to a vertical upright support 50 securely attached to the cylinder 15. Density is controlled by the level of applied pressure by the piston member 16 during the solid dry ice 18 forming process. Thus, the length of the dry ice pellets 44 is controlled along with the cross-sectional dimensions as well as the density.

The dry ice pellitizer 10 is computer controlled to simultaneously coordinate and activate various operations in response to predetermined set perameters. A computer 60 is electrically interconnected to the piston measuring device 12 by an electrical lead 12 operative to actuate movement of the piston 12 forwardly during compression of liquid carbon dioxide into solid dry ice 18 in the compression chamber 15 at a predetermined computer controlled pressure to form solid dry ice 18 at a computer controlled length. Upon reaching the preselected length, the computer 60 then initiates a controlled intermittent repeating start-stop action of the pistons 24 and 16 to enable the cutting means 40 to effect a clean cut during the momentary stop-mode of the piston 12. The start-stop functions can be actuated by increasing and maintaining the maximum operating pressure during extrusion for the start function followed by considerable reduction in extrusion pressure momentarily for the stop function. Upon actuating the stop function, the computer 60 actuates the cutting means 40 via electronic lead 64 whereby the stop mode and cutting mode operates simultaneously. The stop mode actuated in conjunction with a reduction in applied piston pressure is necessary to avoid continuous extrusion during the cutting operation and avoid non-uniform size pellets 44. The computer 60 further controls the $CO_2$ source 17 by electronic lead 66 for controlling the timing and the amount of liquid carbon dioxide injected into the compression cylinder 15.

In accordance with this invention, the dry ice pellet 44 size can be controlled in respect to all dimensions as well as density. The pellet 44 diameter or other cross-section such as square or triangular are preferably symetrical with uniform dimensions and are controlled by the plurality of constant cross-section apertures 22 in the die 20. The length of the pellet 44 is determined by the time interval of the measuring device 12. Preferably the length of the pellet is approximately the same as the cross-sectional dimension such that a cylindrical pellet 44 would exhibit identical cylindrical diameter and length. Similarly, a square pellet 44 would have an extrudate length or equal dimension to the cross-sectional dimensions to produce a cubic pellet 44. Die aperture 22 sizes can be varied as desired along with applied piston pressures in conjunction with desired start-stop cycles.

In accordance with the process of this invention, the computer means 60 controls step-wise operations of the dry ice pellitizer 10. When the piston measuring device 12 is in the retracted position where head 24 is retracted toward rear cylinder wall 29, liquid carbon dioxide is automatically injected under released pressure to form carbon dioxide snow in the compression chamber 18 disposed ahead of the retracted forward piston head 16. Upon filling the compression chamber 18 with a controlled amount of liquid carbon dioxide the computer 60 then activates forward movement of the piston 24 and 16 to compress the carbon dioxide snow into solid dry ice 18, as shown in FIG. 1.

Any carbon dioxide formed during the snow formation and compression into solid dry ice 18 can be expelled from the vent 34. The forward movement of the piston 24 and 16 is predetermined by sufficient pressure build up applied to the piston 24 and 16 to from good solid dry ice 44. At 2,500 PSI applied pressure, for example, good solid dry ice 44 can be formed. Upon reaching the predetermined pressure, the computer 60 then initiates a start-stop cycle where the start mode continuous forward movement at constant pressure to form extrudate emerging from the die openings 22 while the stop mode is interjected momentarily by dropping the applied pressure considerably to enable the cutting means 40 to clearly cut the extrudate pellets 44 to the predetermined desired length. Applied pressure of 2,500 Psi, for instance, can be reduced by the computer 60 to about 20% to 2000 Psi during the momentary stop mode while cutting blade 42 is computer activated. The start-stop cycle advantageously avoids continuing extrusion during the downward cut of the cutting blade 42. The computer 60 measures the linear dimension of dry ice extrudate passing through the die 20 and activates the cutting means 40 accordingly to obtain the predetermined length dry ice extrudate. The density and cross-sectional dimension of the pellets 44 are determined by the number and size of the apertures 22 in the die 20 while linear length is controlled by the computer activated cutting means 42 and can be controlled within 1/1000 ths of an inch. Pellet density can be further increased by increasing the applied pressure and vice versa.

The pellitizer 10 of this invention controls the pellet cross-sectional dimensions along with the density through the use of various size die openings. Dies with predetermined size diameters and with tapered inlets effectively control diameter and pellet density. Preferred pellets 44 exhibit the identical lengths and diameter which enables maximum acceleration of the pellets 44 in use during sand blasting of the target surface.

Referring now to FIG. 3, a schematic diagram is shown including the pellitizer in use for pellet blasting a target surface. Liquefied $CO_2$ is maintained in a source 17 fed under pressure through feed line 19 to the pellitizer 10 as previously described. The pellitizer produces pellets 44 collected in the bin 46 which in turn feeds pellets 44 into a compressed air system 70 for carrying the pellets 44 to a discharge nozzle 72 directed at a target surface 74. The dry ice pellets 44 projected from the nozzle 72 at high velocity will hit the target surface 74 with sufficient impact to uniformly blast the surface 74 clean. The impacting dry ice pellets 44 will sublime after impact from solid dry ice to vaporous carbon dioxide thereby eliminating solid waste associated with conventional mineral sand blasting. Frequently in use, two pellitizers 10 are used together as a coordinated pair where the two are computer synchronized to enable the first pellitizer to be in the extrusion mode while the second pellitizer 10a is being filled with liquid carbon dioxide. Similarly, the second pellitizer 10a extrudes pellets 44 while the first pellitizer 10 is being reloaded with liquid carbon dioxide.

The advantages of the invention over prior art pellitizers resides in attaining desired shapes, density, sizes and lengths of the pellets for use in particle blasting. Acceleration of the pellets may be maximized when the diameters and lengths are computerized to be the same. The invention further achieves better cleaning results on the surfaces being blasted.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What I claim:

1. A dry ice pellitizer apparatus for producing solid dry ice pellets of predetermined size from a source of liquid carbon dioxide, the pellitizer comprising:

cylinder extrusion means operatively controlled by a computer means, the cylinder containing a movable piston having a forward piston head operative to move forwardly and rearwardly within the cylinder, the cylinder containing a forward wall die member having a plurality of identical cross-sectional through openings, a compression chamber forwardly disposed within the cylinder and containing the forward piston head, the piston being computer controlled to move forwardly a measured distance to compress carbon dioxide into solid dry ice of a predetermined density within the compression chamber, dry ice pellets being extrudated a selected measured distance through the die member, said pellitizer equipped with computer controlled external cutting means operative to cut dry ice extrudate emerging from the die to produce dry ice pellets of a predetermined density and predetermined dimension.

2. The dry ice pellitizer of claim 1 where the carbon dioxide forms solidified carbon dioxide snow in the compression chamber.

3. The dry ice pellitizer of claim 1 where the computer controlled piston is in a retracted position within the compression chamber and the liquified carbon dioxide feed is from a computer controlled source operative to fill the compression chamber.

4. The dry ice pellitizer of claim 1 where the piston is a hydraulic operated piston operative to provide preselected pressure to the piston head.

5. The dry ice pellitizer of claim 4 where the hydraulic pressure is computer controlled and, upon reaching a preselected pressure, the computer actuates forward movement of the piston.

6. The dry ice pellitizer of claim 1 where the forward movement of the piston is computer controlled on a start-stop cycle where the stop mode is momentarily to enable cutting of dry ice extrudate into pellets.

7. The dry ice pellitizer of claim 6 where the start mode is at the predetermined applied pressure and the stop mode is effected by reducing the applied pressure by at least about 20%.

8. The dry ice pellitizer of claim 6 where the start mode computer controls the forward movement of the piston for a distance sufficient to produce dry ice extrudate of predetermined length.

9. The dry ice pellitizer of claim 6 where the computer actuates cutting movement of the cutting means during the stop mode of the piston movement.

10. The dry ice pellitizer of claim 1 where the cutting means comprises a downwardly descending sharp cutting blade.

11. The dry ice pellitizer of claim 1 where the apertures in the die means have equalized cross-sectional dimensions.

12. The dry ice pellitizer of claim 11 where the cross-sectional dimensions define a circle.

13. The dry ice pellitizer of circle 12 where the length of the pellets extrudated equals the diameter of the circular pellets.

14. The dry ice pellitizer of claim 11 where the cross-sectional dimensions define a square.

15. The dry ice pellitizer of claim 14 where the length of the pellets extruded, equals the dimension defining the square pellets.

16. The dry ice pellitizer of claim 1 where the computer controlled retracting movement of the piston fills the compression chamber with carbon dioxide and forward movement of the piston to form compressed solid dry ice in the compression chamber.

17. In a process for producing solid dry ice pellets of a predetermined size and density, the dry ice pellets produced by extruding solid dry ice, the improvement in the process comprising:

providing a computer controlled piston and cylinder extrusion device adapted to receive liquified carbon dioxide from a source forming solid dry ice under pressure;

controlling the pressure applied by the piston to form solid dry ice of a preselected density;

controlling the forward movement of the piston under a start-stop cycle to extrude dry ice pellets of a predetermined length during the start mode; and cutting the extrudate during the stop mode to form extruded dry ice pellets of predetermined length.

18. The process of claim 17 where the cutting step is computer controlled to synchronize with the stop mode.

19. The process of claim 17 where the lengths of the dry ice pellets are the same dimension as the cross-sectional dimension of the die openings.

20. The process of claim 19 where the pellets are cylindrical and the extruded length is the same as the cylindrical diameter of the pellets.

21. The process of claim 17 where the applied pressure in the start mode is reduced at least about 20% momentarily to effect the stop mode.

22. The process of claim 17 where the piston is hydraulic fluid activated to apply the applied pressure.

23. The process of claim 17 where the computer actuates forward movement of the piston upon reaching the predetermined applied pressure.

* * * * *